Aug. 31, 1937.   P. LEIJDENS   2,091,601
FLASH LAMP
Filed March 15, 1935   2 Sheets-Sheet 2

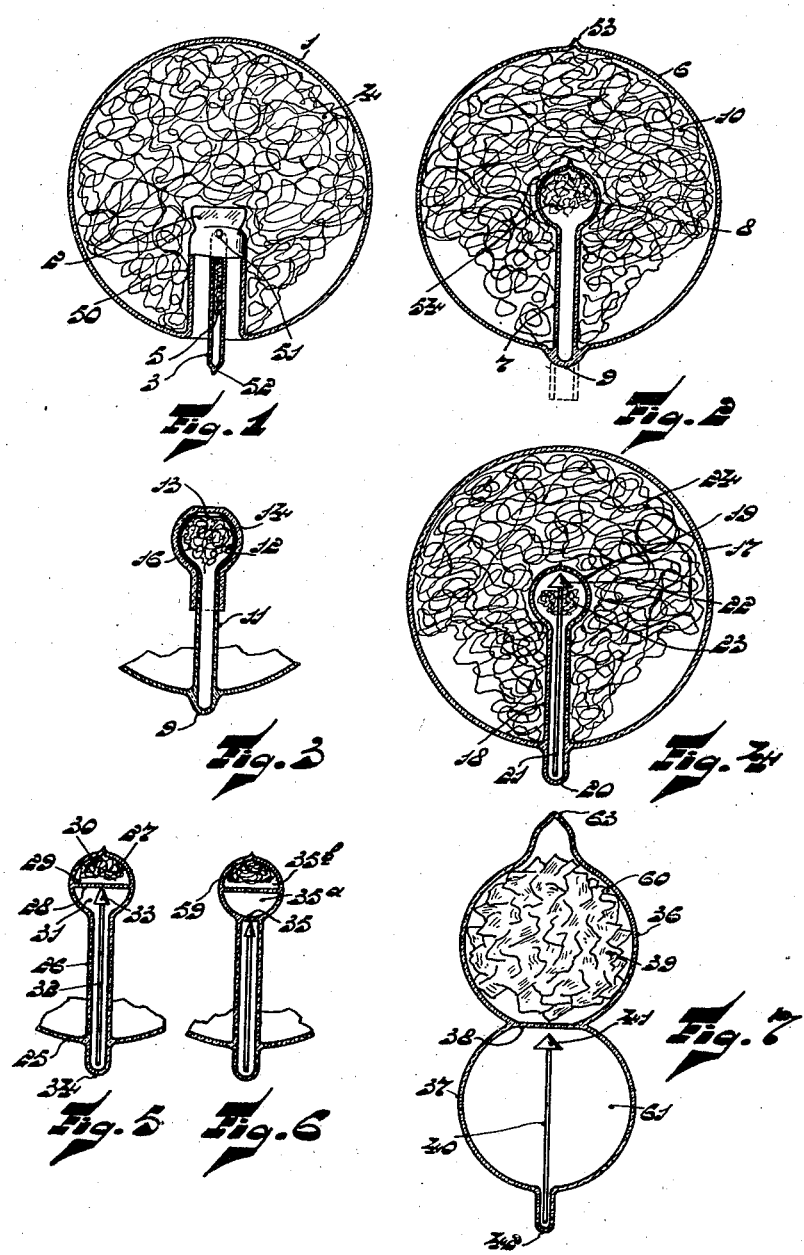

INVENTOR
PIETER LEIJDENS
BY
ATTORNEY

Patented Aug. 31, 1937

2,091,601

UNITED STATES PATENT OFFICE 2,091,601

FLASH LAMP

Pieter Leijdens, Eindhoven, Netherlands, assignor to N. V. Philips' Gloeilampenfabrieken, Eindhoven, Netherlands Application March 15, 1935, Serial No. 11,329
In Germany March 26, 1934

11 Claims. (Cl. 67—33)

The present invention relates to a novel type of flash lamp, in which the combustion of the actinic light-producing substance is effected by spontaneous reaction.

As is well known, flash lamps emit actinic light produced by the combustion of a solid material or mixture, or by the reaction taking place between gases. To initiate the combustion, or reaction, various means have been already suggested. For instance, it has been suggested to initiate the combustion by mechanical means, for instance, by friction or shock; or again, by means of a flame.

In present-day flash lamps, combustion or reaction is generally initiated by electrical means; i. e., by heating up a wire or an ignition mixture to the temperature at which the combustion or reaction takes place.

Initiating the combustion by friction, shock, or flame has drawbacks whereas the present-day flash lamps using electrical ignition require for this purpose an electrical supply source.

My invention obviates these drawbacks and provides for a simple and efficient flash lamp. According to my invention, operation of the combustion or reaction is initiated by means of a "spontaneous reaction". The term "spontaneous reaction" as used herein is to be understood to mean, a reaction which takes place automatically between certain materials in the form of a controlled explosion, when such materials are merely brought together at ordinary room temperatures. Such a reaction does not have to be initiated by thermal or mechanical means, as is the case in prior flash lights, but occurs automatically when the materials come together.

Materials suitable for use in carrying out my invention are various pyrophorous substances, for example pyrophoric iron, pyrophoric lead, sodium, yellow phosphorus—these substances giving a spontaneous reaction when brought together with oxygen or air. Similarly barium as obtained from barium nitrate, pyrophoric barium-tin, and calcium tin alloys may be used successfully to give a spontaneous reaction in the presence of oxygen or air.

The invention may be carried out in various manners and will be more clearly understood by reference to the several embodiments shown as examples in the accompanying drawings in which:

Fig. 1 is a partly sectionized side view of a flash lamp showing one embodiment of my invention;

Fig. 2 is a sectionized side view showing another embodiment of my invention;

Fig. 3 is a sectionized view of part of a flash lamp showing a modification of the disposition of the spontaneously reacting ignition materials;

Fig. 4 is a sectionized side view of a further embodiment of my invention;

Figs. 5 and 6 are partial and sectionized views of further embodiments of my invention;

Fig. 7 is a sectionized side view of a still further embodiment of my invention;

Figure 8:
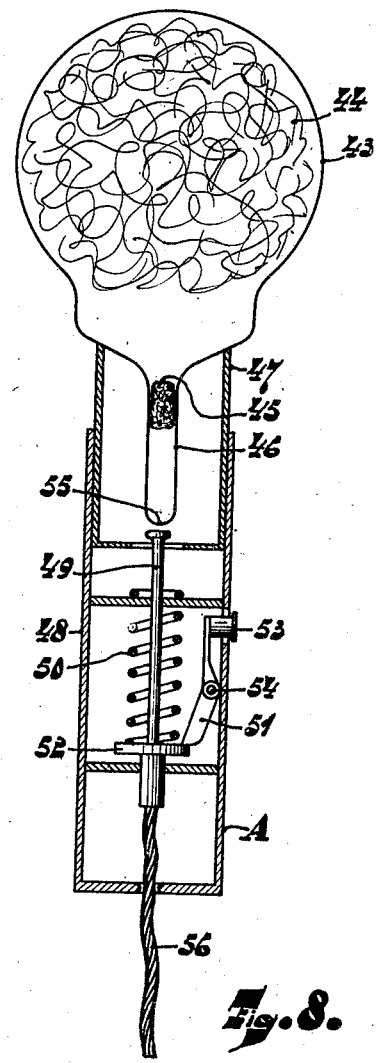
Fig. 8 is a diagrammatic view showing a device for initiating the operation of the flash lamp according to any of the embodiments shown in Fig. 1.

Referring to Fig. 1, the flash lamp shown therein comprises a bulb 1, consisting of a material which is transparent to actinic light, for instance transparent glass, and has the general shape of the usual incandescent lamp bulb. The bulb is provided with a reentrant stem portion 50, whose end is formed as a pinch 2. For exhausting the bulb there is provided the usual type exhaust tube 3 connected with the inside of the bulb through the opening 51, and through which the bulb is exhausted in known manner.

Within the bulb and supported by the stem 50 is a combustible material 4 shown as a clew of drawn magnesium or magnesium alloy wire, such material being as decribed in the copending U. S. application of v. Liempt No. 723,008, filed April 28, 1934.

Placed within the exhaust tube 3 is a wadded pellet 5, soaked or impregnated with a solution of a pyrophorous substance for example, yellow phosphorus dissolved in carbon disulphide. ($CS_2$).

After the lamp has been exhausted in the known manner during which the solvent of the yellow phosphorus, i. e. the carbon disulphide, is evaporated and also drawn off together with air from the bulb, the exhaust tube is sealed off at 52 and the bulb is ready for operation. Prior to or during the exhaustion no reaction of the pyrophorous substance takes place.

To initiate operation of the lamp all that is required is the breaking or piercing of the exhaust tube 3, which can be easily achieved, as this tube extends some distance beyond the contour of the lamp. To effect this breaking various mechanical means can be used, as will be explained hereinafter in connection with Fig. 8.

Upon breakage of the exhaust tube 3, air is admitted into contact with the dry yellow phosphorus carried by the pellet 5 and thereby causes a vigorous spontaneous reaction to take place which produces sufficient heat to cause the rapid combustion of the magnesium wire 4, which produces the desired actinic light. In this case the combustion of the magnesium wire 4 takes place in the air, which is admitted into the bulb through the exhaust tube 3 and opening 51.

To obviate the necessity of supplying the air required for the combustion of the combustible material from the outside, the pyrophorous substance may be disposed within a closed space which is not in communication with the interior of the bulb, such arrangement being shown in Fig. 2.

The bulb 6 of the lamp shown in Fig. 2 again contains a clew 10 of drawn magnesium wire, and is provided with a tube 7 extending into the central portion of the bulb 6, where it forms a thin-walled small spherical chamber 8, which is separated from the interior of the bulb.

The bulb is exhausted through an exhaust tube secured at 53, then filled with oxygen, and sealed off at 53.

The chamber 8 contains a pyrophorous material 54, for instance, pyrophoric iron, and is exhausted together with the tube 7 which originally extends with an open end outside of the bulb, as indicated in dotted lines. After exhaustion of the tube 7 and chamber 8, tube 7 is sealed off so as to form on the bulb a small hemispherical protuberance 9; the wall of which is thinned down at its central portion.

To ignite the lamp this thin-walled portion of the bulb 9 is smashed or pierced, whereby air is admitted to the pyrophorous material 54, and causes its spontaneous reaction, thereby producing a sufficient heat to break or fuse the thin wall portion of chamber 8, the heat at the same time causing combustion of the magnesium wire in the oxygen contained in the bulb 6.

As in this embodiment, the combustion of the magnesium wire takes place in substantially pure oxygen, the rate of reaction is much higher than it is in the case of the lamp of Fig. 1 in which the oxygen of the atmospheric air flowing into the bulb is used.

Fig. 3 relates to a lamp which may be of a construction similar to that shown in Fig. 2, except that the spherical portion 12 of the tube 11, instead of having a thin wall portion at the top, is provided there with an aperture 13. However, the portion 12, which contains the pyrophorous material 16 is closed toward the interior of the bulb 6 by means of a rubber envelope 14 which is slipped over and tightly fits same, and also partly surrounds the adjacent portion of tube 11.

When the thin-walled portion 9 of the lamp is broken or pierced, the air is admitted to the tube 11 and causes the spontaneous reaction of the material 16. The heat produced thereby causes immediate destruction of the rubber envelope at the aperture 13 and at the same instant causes the flash-light material, for instance, the combustible wire 10 of Fig. 2, to react with the oxygen filling of the lamp.

The lamp shown in Fig. 4 is similar to that of Fig. 2 except that there is provided in the spherical chamber 19—which contains the pyrophorous material 23—a pointed conical head 22 carried by a rod 21, which rod extends substantially the full length of the tube 18. The tube 18 extends slightly outside the bulb 17 and forms a rounded and thin-walled end portion 20.

When breaking end portion 20, the rod 21 is at the same time forced upwardly and its end 22 smashes or pierces the thin-walled top of chamber 19, whereby upon ignition and substantially simultaneously with the reaction of the pyrophorous material 23, combustion of the combustible material 24 takes place.

Fig. 5 corresponds to a lamp which can be of the same construction as that shown in Fig. 4 and in which the spherical portion 27, carried by the tube 26, is divided by the wall 28 to form two separated spaces 29 and 31. In space 29 is provided the pyrophorous material 30, while the space 31 is filled with oxygen and contains a rod 32 provided on its upper end with a pointed head 33. Upon smashing the tube end 34, the head 32 breaks or pierces the walls 28 and 27. This immediately causes spontaneous reaction of the material 30, and reaction of the flash material, which again may be drawn magnesium wire placed in an oxygen atmosphere.

In a still further embodiment as shown in Fig. 6, a separate wall 35 may be provided and the space 35a may be filled with a special material 59 for instance potassium chlorate (KClO₃) which vigorously reacts with the pyrophorous material 35b for instance amorphous phosphorus.

Another embodiment of the invention is shown in Fig. 7 in which the bulb consists of two substantially spherical portions 36 and 37 which are divided by a thin partitioning wall 38 into two chambers 60 and 61. In the chamber 60 is disposed the flash light material 39, for instance an aluminum foil soaked in a carbon disulphide solution of yellow phosphorus. The chamber 60 is then exhausted in known manner and sealed off at 63; the carbon disulphide solvent being evaporated and drawn off during the exhausting.

Within the chamber 61 is disposed a rod 40 carrying on its inner end a conical head 41, while its other end extends into an extension 42, of the portion 37. The chamber 61 is exhausted in known manner and filled with oxygen after which it is sealed off at 42.

To initiate the ignition of the flash lamp the thin-walled extension 42 is smashed which at the same time moves the rod 40 upward thus causing the point 41 to destroy the thin wall 38. The destruction of the wall 38 allows the oxygen of chamber 61 to enter chamber 60 to thus cause spontaneous reaction of the phosphorus, which causes at the same time the aluminium foil to react simultaneously in its entire volume with the oxygen.

Instead of treating the aluminum foil only with phosphorus it may also be additionally provided with a layer of potassium chlorate (KClO₃). This greatly reduces the amount of oxygen required for the spontaneous reaction and thus permits a considerable reduction in the size of chamber 61. Good results may also be obtained by coating the aluminum foil with the pyrophorous material, f. i. by treating with a solution of yellow phosphorus in carbon disulphide.

A device A, by which the breakage or piercing of the thin-walled end portion of the tube may be effected at the desired moment and which can be applied to any of the lamps shown in Figs. 1 to 7 is schematically illustrated in Fig. 8 as applied to a lamp built in accordance with the invention. The flash lamp comprises an exhausted glass bulb 43 containing as the combustible material the aluminum foil 44, and is provided with a tubular portion 46 within which is disposed a wadded pellet 45, containing for example, yellow phosphorus. To the tubular portion 46 is secured, for instance by cement, a cap 47 which removably fits into a housing 48 with a tight fit. Within the housing is provided a rod 49 which cooperates with a tension spring 50.

In the position shown in Fig. 8 the spring 50 is maintained in its stretched position by means of a lever 51 engaging a plate 52 and holding same in the position shown. Cooperating with the lever 51, is a push button 53, upon pressing of which the lever 51 is rotated about its spindle 54 and releases the spring 50.

Under the action of the spring 50, the plate 52 lifts the rod 49, causing the smashing of wall portion 55. This admits air into the tubular portion 46 and initiates the reaction as has been described in connection with previous figures. For resetting the device, a stretching cord 56 may be provided which when pulled stretches the spring 50 and returns the device to its operative position.

The device A forms an attachment which can be readily applied to and removed from a flash lamp and thus can be used for any number of lamps.

While I have described my invention with reference to specific embodiments and in connection with a specific application I do not wish to be limited thereto as various modifications thereof may suggest themselves. For example, any suitable combustible material producing the desired actinic light or gases entering into an actinic light-emitting reaction may be used. Therefore, I desire the appended claims to be construed as broadly as permissible in view of the prior art.

What I claim is:—

1. A flash lamp comprising a closed container of actinic light-transmitting material, an actinic light-producing material in said container, and means to ignite said material, said means comprising substances producing a vigorous exothermic chemical reaction when together, and means for bringing said substances together.

2. A flash lamp comprising a closed container of actinic light-transmitting material, an actinic light-producing material in said container, and means to ignite said material, said means comprising a substance adapted to enter into a vigorous exothermal chemical reaction with oxygen, and means to bring oxygen into contact with said substance.

3. A flash-lamp comprising a closed container of actinic light-transmitting material, an actinic light-emitting material within said container, and means to initiate the light emission of the lamp, said means comprising substances producing a vigorous exothermic chemical reaction when together, and an easily breakable partition member separating said substances.

4. A flash lamp comprising a closed container of actinic light-transmitting material and having an easily breakable portion, an actinic light-producing material and a pyrophoric mass within said container, and means to admit air by the breakage of said portion to cause a spontaneous reaction of said mass and an actinic light emission by said light-producing material.

5. A flash lamp comprising a closed container of actinic light-transmitting material, an actinic light-producing material in said container, and means to ignite said material comprising a substance and a gas producing a vigorous exothermal chemical reaction when brought together, and means for bringing said substance and gas together to initiate the combustion of said material.

6. A flash lamp comprising a closed container of actinic light-transmitting material, a combustible actinic light-producing material within said container, and means to ignite said light-producing material comprising an ignition substance within said container, a gas serving as a combustion agent for said light-producing agent, said ignition substance producing a vigorous exothermal chemical reaction when brought into the presence of said gas, and means to simultaneously bring said gas into contact with said light-producing material and said substance to initiate the operation of said lamp and to support the combustion of said light-producing material.

7. A flash lamp comprising a closed container of actinic light-transmitting material having two separated chambers, an actinic light-producing material and a gas within one of said chambers, said gas serving as a combustion agent for said light-producing material, and means to initiate the combustion of said material comprising an ignition substance within the other chamber, said substance being capable of producing a vigorous exothermal chemical reaction when brought into the presence of air, and means for admitting air to said second chamber to initiate the operation of the lamp.

8. A flash lamp comprising a closed container of actinic light-transmitting material, an actinic light-producing material and a gas within said container, said gas acting as a combustion agent for said light-producing material, and means to initiate the combustion of said light-producing material comprising an evacuated tubular member forming part of said container and extending therein, said member being closed from the space occupied by said light-producing material and said gas and having a breakable portion at the surface of the container, an ignition substance within said member and capable of producing a vigorous exothermal chemical reaction in the presence of air, and a smashing member within said tubular member for rupturing the wall of said tubular member upon breakage of said fragile portion.

9. A flash lamp comprising a closed container of actinic light-transmitting material, an actinic light-producing material and a gaseous combustion agent therefor within said container, and means for initiating the combustion of said light-producing material comprising a closed tubular member forming part of said container and having a fragile portion at the surface thereof, a partition separating said tubular member into an evacuated chamber and a second chamber adjacent said fragile portion, an ignition substance within said evacuated chamber, a gas within said second chamber capable of producing a vigorous exothermal chemical reaction when brought into the presence of said substance, and a smashing member within said second chamber for rupturing said partition and the wall of the evacuated chamber.

10. A flash lamp comprising a closed container of actinic light-producing material, an actinic light-producing material and a gaseous combustion agent therefor within said container, and means to initiate the combustion of said light-producing material comprising an inwardly-projecting closed tubular member forming part of said envelope, two breakable partitions separating said member into three chambers, a pyrophoric substance in one of said chambers, a substance within the adjacent chamber and capable of producing a vigorous exothermal chemical reaction when brought into contact with said pyrophoric substance, and a smashing member within said third chamber for rupturing said partitions and the wall of the chamber containing said pyrophoric substance.

11. A flash lamp comprising a closed container of actinic light-transmitting material having a breakable partition separating the container into an evacuated chamber and a second chamber, an actinic light-producing material within said evacuated chamber, an ignition substance carried by said light-producing material, a gaseous combustion agent for said light-producing material within said second chamber, said ignition substance being capable of producing a vigorous exothermal chemical reaction when brought into the presence of said combustion agent, and means including a smashing member in said second chamber for rupturing said partition to admit said combustion agent into said evacuated chamber.

PIETER LEIJDENS.